United States Patent [19]

Sakuma et al.

[11] Patent Number: 4,763,260

[45] Date of Patent: Aug. 9, 1988

[54] ANTISKID CONTROL DEVICE

[75] Inventors: Masaru Sakuma, Kawasaki; Susumu Sawano, Koganei, both of Japan

[73] Assignee: Tokico Ltd., Kawasaki, Japan

[21] Appl. No.: 932,143

[22] Filed: Nov. 18, 1986

[30] Foreign Application Priority Data

Nov. 20, 1985 [JP] Japan .................. 60-260616

[51] Int. Cl.$^4$ .............................. B60T 8/32
[52] U.S. Cl. ................... 364/426; 303/100; 303/105
[58] Field of Search ......... 364/426, 565, 571; 180/197; 361/238; 303/92, 95, 100, 102, 103, 110, 105; 188/181 A

[56] References Cited

U.S. PATENT DOCUMENTS

| | | | |
|---|---|---|---|
| 3,966,267 | 6/1976 | McNinch, Jr. et al. | 303/92 |
| 4,430,714 | 2/1984 | Matsuda et al. | 364/426 |
| 4,665,490 | 5/1987 | Masaki et al. | 303/110 |
| 4,666,218 | 5/1987 | Masaki et al. | 364/426 |
| 4,671,579 | 6/1987 | Sawano et al. | 364/426 |
| 4,672,547 | 6/1987 | Masaki et al. | 364/426 |

Primary Examiner—Gary Chin
Attorney, Agent, or Firm—Cushman, Darby & Cushman

[57] ABSTRACT

An antiskid control device, comprising a detector for detecting a circumferential speed of wheel, a valve for controlling a hydraulic braking force to the wheel, and an electronic control circuit for determining a ratio of a mean value of rising rates and a mean value of lowering rates of the circumferential speed of wheel in a predetermined period of time in every antiskid control cycle for rise and drop of the circumferential speed of wheel based on a detection signal from the detector, for estimating a coefficient of friction of road surface from the ratio to correct the target circumferential speed of wheel based on the estimated coefficient of friction of road surface, and for operating the valve means to let the wheel circumferential speed approach the corrected target circumferential speed.

3 Claims, 7 Drawing Sheets

ANTISKID CONTROL DEVICE

BACKGROUND OF THE INVENTION

1. Field of the Invention

This invention relates to an antiskid control device adaptable to a braking system for vehicles.

2. Description of the Prior Art

Supposing that the vehicle speed is V and the circumferential speed of wheel is $V_w$, then the slip rate S is defined by the following equation:

$$S = \frac{V - V_w}{V}.$$

It is also known that when the coefficient of friction, in the vehicle moving direction, between the wheel and the ground surface contacting therewith is given as $\mu$, there exists a relation such as depicted by curve a in FIG. 1 between the slip rate S and the coefficient of friction $\mu$. In the plotting of FIG. 1, the measure on the vertical axis $\mu$ is normalized, whereby the maximum value of $\mu$ is 1. As seen from FIG. 1, generally the coefficient of friction $\mu$ has the maximum value when the slip rate S is 0.2 or close thereto and lowers with the increase of slip rate S when the wheel is locked against rotation by, for instance, sudden application of brakes. Therefore, in order to let the vehicle stop in a minimum distance by applying a braking force to the wheels, it is desirable that the braking force be applied to the wheels such that the coefficient of friction $\mu$ will always approach the maximum value during braking, in other words, the slip rate S will be retained close to 0.2. Thus, an antiskid control device for vehicle braking system has been required which is capable of controlling the braking force applied to the wheels so that the slip rate S will take a favorable value as mentioned above.

It is generally difficult to directly measure the slip rate of a running vehicle, for example, an automobile. Therefore, antiskid control devices designed to meet said requirement by using the measurable values relating to the slip rate S have been proposed. In one of such proposed antiskid control devices, the ratio between the rising rate and the lowering rate of the circumferential speed of wheel is simply determined and the coefficient of friction $\mu$ is estimated therefrom to thereby control the braking force supplied to the wheels. According to such device, however, although a desirable braking performance may be obtained when the vehicle is running on a flat surface and the like, it is unable to produce a satisfactory antiskid action on a rough road since the circumferential speed of wheel won't make smooth increase or decrease and therefore the determined values of said ratio vary widely.

SUMMARY OF THE INVENTION

The present invention is envisaged to eliminate the above discussed problems of the prior art, and to this end it provides an antiskid control device which is capable of applying a controlled braking force to the wheel corresponding to the change of coefficient of friction between the wheel and the ground surface contacting with it even when the vehicle is running on a rough road or ground, thereby enabling effective prevention of unnecessary locking of the wheel and the maximum reduction of the braking distance.

According to the present invention, the object mentioned above is accomplished by an antiskid control device comprising a detector for detecting the circumferential speed of wheel, a valve for controlling the hydraulic braking force applied to the wheel, and an electronic control circuit for determining the ratio of the mean value of acceleration to the mean value of deceleration of the circumferential speed of wheel in a predetermined period of time in during every antiskid control cycle for rise and drop of circumferential speed of wheel based on a detection signal from said detector, for estimating the coefficient of road surface friction from said ratio to thereby determine a target circumferential speed of wheel based on the estimated coefficient of friction of road surface, and for operating the valve to let the wheel circumferential speed approach said corrected target circumferential speed.

DESCRIPTION OF THE PREFERRED EMBODIMENT

The present invention will hereinafter be described in more detail in accordance with a preferred embodiment thereof as illustrated in the accompanying drawings.

Figure 1:
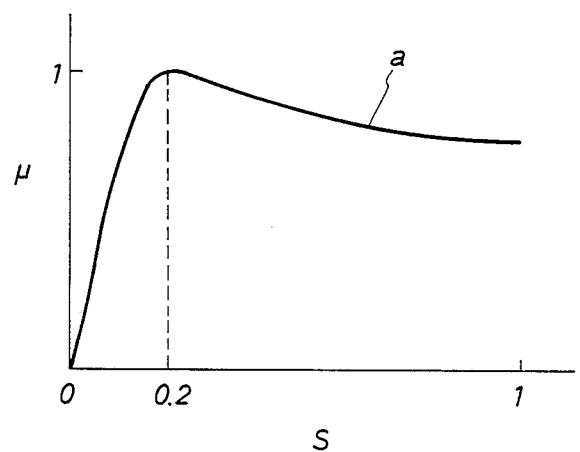
FIG. 1 is a graph showing the relation between slip rate and coefficient of friction.
Figure 2:
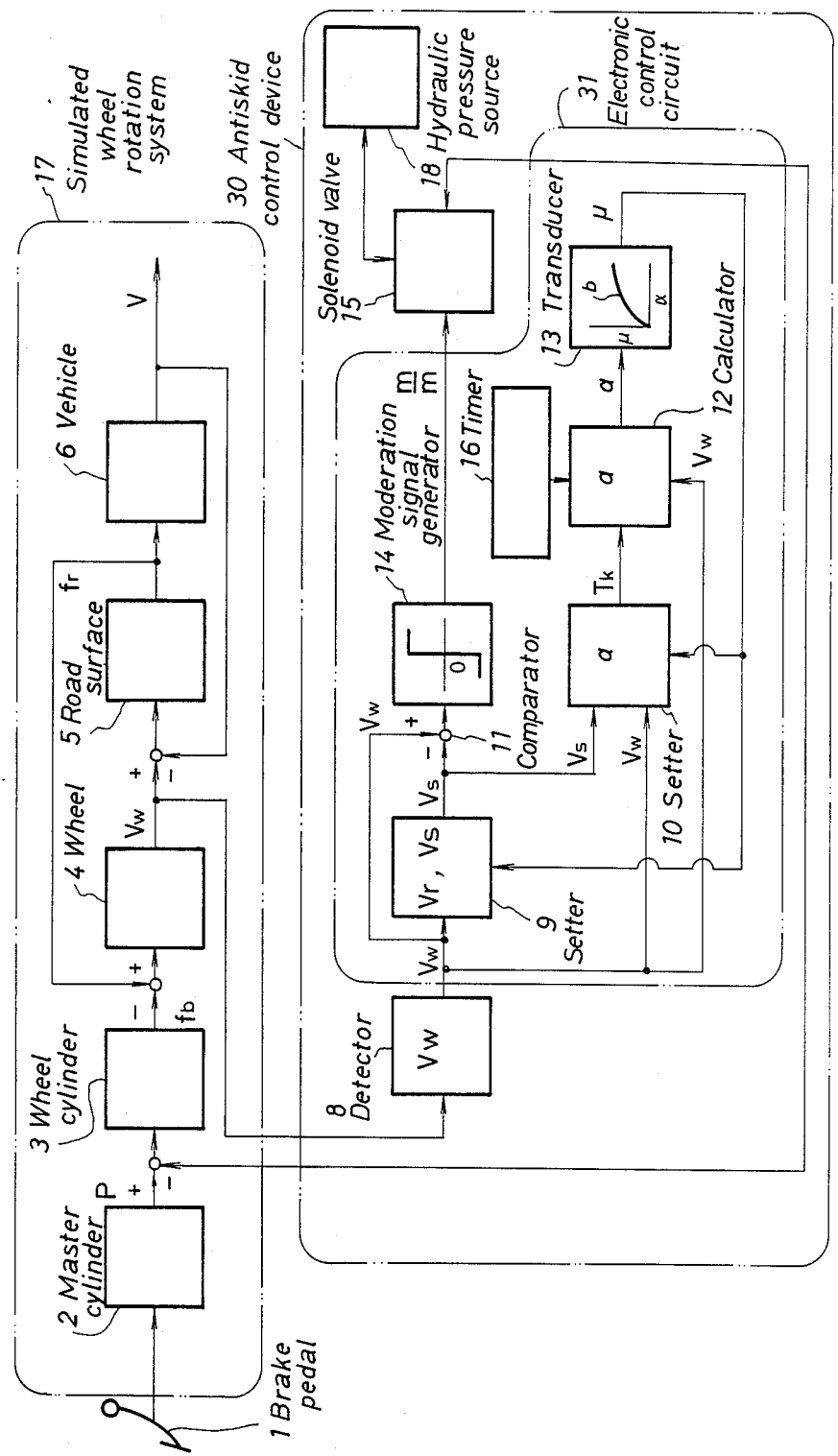
FIG. 2 is a block diagram showing a preferred embodiment of the present invention.
Figure 3:
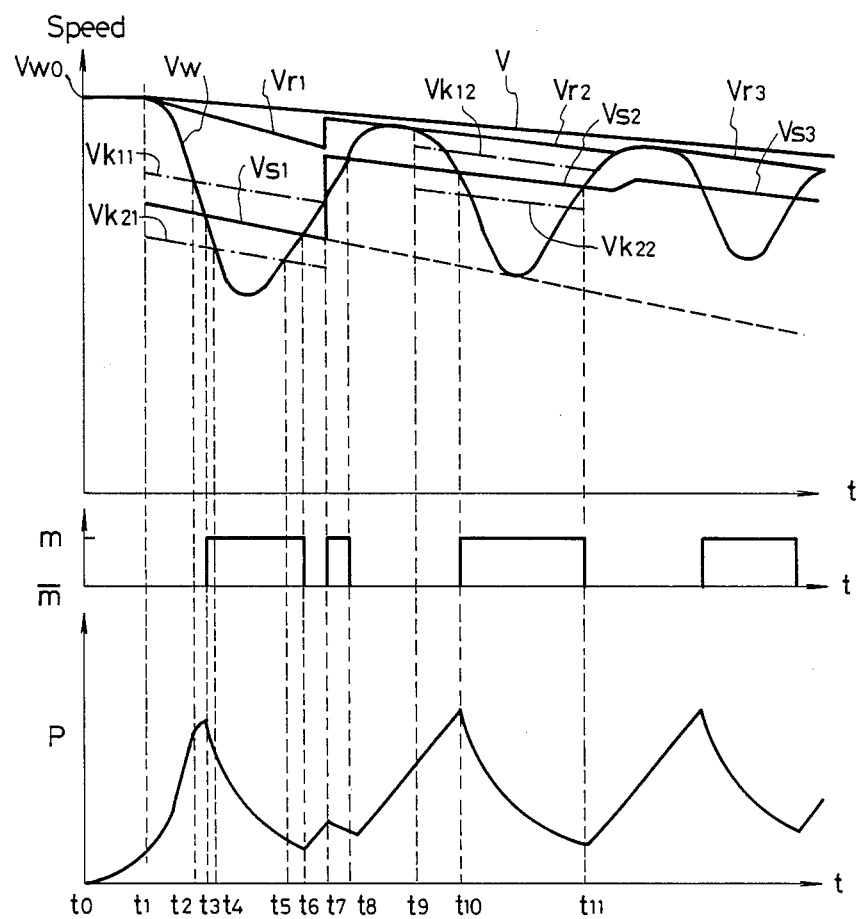
FIG. 3 is an operation time chart of the embodiment shown in FIG. 2.

Referring to FIGS. 2 and 3, the depressing force on the brake pedal 1 is transmitted to the master cylinder 2 which generates a hydraulic pressure P according to said depressing force, said hydraulic pressure being transferred to the wheel cylinder 3.

Said wheel cylinder 3 generates a braking force $f_b$ corresponding to the supplied hydraulic pressure P, and the wheel 4 of the automobile is braked by the difference between said braking force $f_b$ and the driving force $f_r$ from the road surface 5 based on the coefficient of friction $\mu$ between the wheel 4 and the road surface 5 contacting with said wheel 4, whereby the circumferential speed $V_w$ of the wheel 4 is determined. The slip rate S is decided by the difference between said circumferential speed $V_w$ and the speed V of the vehicle 6, and the coefficient of friction $\mu$ between the wheel 4 and the road surface 5 is decided in accordance with said slip rate S. The speed V of the vehicle 6 is changed by the frictional force given to the wheel 4 from the road surface 5 based on said determined coefficient of friction $\mu$. The circumferential speed of wheel $V_w$ is detected by a wheel circumferential speed detector 8 from the rotational speed of the wheel 4. Said circumferential speed detector 8 comprises an electromagnetic or optical pulse oscillator, a counter and a factor (wheel diameter) multiplier and the like. The wheel circumferential speed $V_w$ detected by said detector 8 is supplied to a target wheel circumferential speed setter 9, a wheel circumferential speed measuring section setter 10, a comparator 11 and a calculator 12. Said setter 9 calculates the simulated vehicle speed $V_r$ based on the wheel circumferential speed $V_w$ supplied from the detector 8 and the coefficient of friction $\mu$ supplied from a transducer 13, and the target wheel circumferential speed $V_s$ is calculated from said calculated simulated vehicle speed $V_r$ and the preset optimal slip rate $S_r$ and delivers to the setter 10 and comparator 11. Said comparator 11 compares the target wheel circumferential speed $V_s$ with the actual wheel circumferential speed $V_w$ and derives the result of comparison to a moderation signal generator 14. Said signal generator 14 delivers a moderation signal m to a solenoid valve 15 on receiving the result of comparison that the actual wheel circumferential speed $V_w$ is lower than the target wheel circumferential speed $V_s$. When it receives the result of comparison that the actual wheel circumferential speed $V_w$ is higher than the target wheel circumferential speed $V_s$, said signal generator 14 delivers a moderation release signal $\overline{m}$ to the solenoid valve 15.

Figure 5:
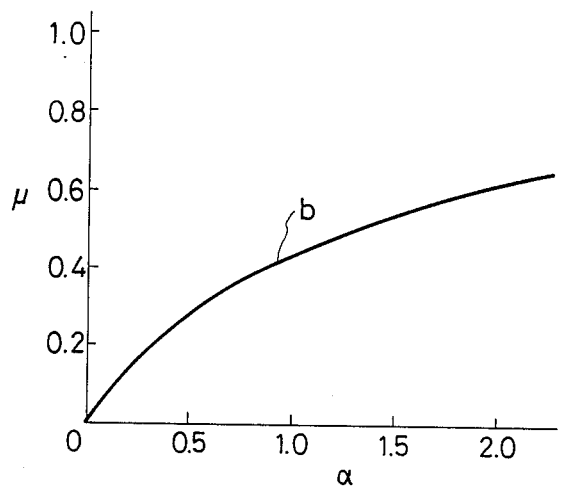
FIG. 5 is a graph showing the relation between the ratio $\alpha$ and the coefficient of friction $\mu$.
Figure 6:
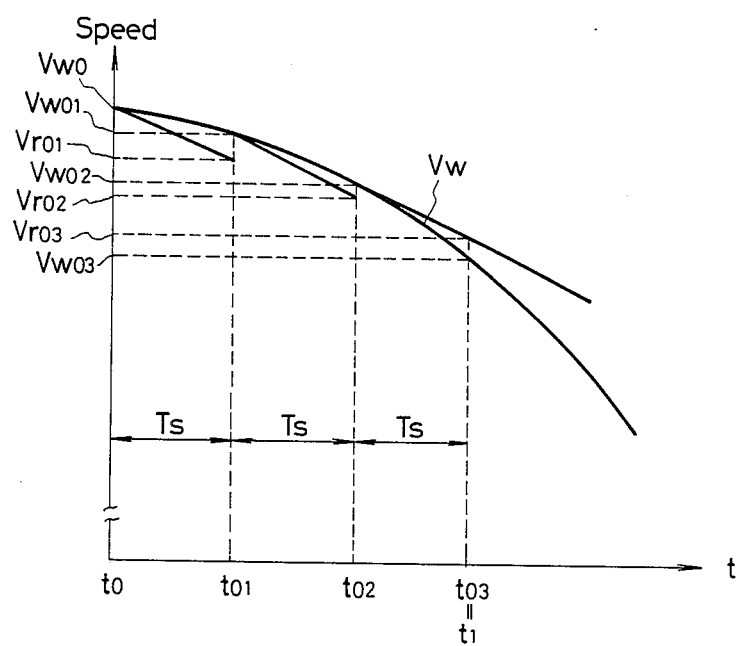
FIG. 6 is a time chart illustrating the setting mode of simulated vehicle speed.

Setter 10 delivers to the calculator 12 a signal $T_k$ which instructs the storage of the wheel circumferential speed $V_w$ to be supplied to the calculator 12 and the time t to be supplied to the calculator 12 from a timer 16 from the supplied target wheel circumferential speed $V_s$ and the actual wheel circumferential speed $V_w$. That is, said setter 10 calculates the target wheel circumferential speeds $V_{k1}$ and $V_{k2}$ of the slip rates of, for instance, 0.1 and 0.3, respectively against the simulated vehicle speed $V_r$ based on the target wheel circumferential speed $V_s$ from the setter 9 and compares these target wheel circumferential speeds $V_{k1}$ and $V_{k2}$ with the actual wheel circumferential speed $V_w$, and it delivers a signal $T_k$ at the point of a time when the actual wheel circumferential speed has become equal to the target wheel circumferential speeds $V_{k1}$ and $V_{k2}$, respectively. Said calculator 12 stores the time $t_p$ from the timer 16 and the wheel circumferential speed $V_{wp}$ from the detector 8 by the signal $T_k$ received from the setter 10 at the time $t_p$ when the actual wheel circumferential speed $V_w$ became equal to the target wheel circumferential speed $V_{k1}$ in the descending phase of the actual wheel circumferential speed, and thereafter, further stores the time $t_q$ from the timer 16 and the wheel circumferential speed $V_{wq}$ from the detector 8 by the signal $T_k$ received from the setter 10 at the time $t_q$ when the actual wheel circumferential speed $V_w$ became equal to the target wheel circumferential speed $V_{k2}$. Then, in the ascending phase of the actual wheel circumferential speed $V_w$, said calculator 12 stores the time $t_r$ from the timer 16 and the wheel circumferential speed $V_{wr}$ from the detector 8 by the signal $T_k$ from the setter 10 at the time $t_r$ when the actual wheel circumferential speed $V_w$ again became equal to the target wheel circumferential speed $V_{k2}$ and further stores the time $t_s$ from the timer 16 and the wheel circumferential speed $V_{ws}$ from the detector 8 by the signal $T_k$ from the setter 10 at the time $t_s$ when the wheel circumferential speed $V_w$ again became equal to the target circumferential speed $V_{k1}$. The ratio $\alpha$ of average acceleration $\overline{V}_{wu}$ to average deceleration $\overline{V}_{md}$, viz. the ratio of the mean value of rising rate and the mean value of lowering rate of wheel circumferential speed, is calculated from the stored times $t_p$, $t_q$, $t_r$, $t_s$ and wheel circumferential speeds $V_{wp}$, $V_{wq}$, $V_{wr}$ and $V_{ws}$ as follows:

$$\alpha = \left| \frac{\overline{V}_{wu}}{\overline{V}_{wd}} \right| = \left| \frac{\frac{V_{ws} - V_{wr}}{t_s - t_r}}{\frac{V_{wq} - V_{wp}}{t_q - t_p}} \right|$$

and the thus calculated ratio $\alpha$ is supplied to the transducer 13. Here, the ratio $\alpha$ is associated with the coefficient of friction $\mu$ of the road surface 5 regardless of the magnitude of moment of inertia of the wheel 4. For instance, when the coefficient of friction $\mu$ is high, said ratio $\alpha$ becomes large, and reversely, when the coefficient of friction $\mu$ is low, said ratio $\alpha$ becomes small. The relation between said ratio $\alpha$ and coefficient of friction $\mu$ can be determined either from the kinematic equation of the simulated wheel rotation system 17 at the time of braking or from the experiments with an actual vehicle. Such relation is depicted by curve b in FIG. 5. The thus determined relation between ratio $\alpha$ and coefficient of friction $\mu$ expressed by the curve b is preset in the transducer 13, so said transducer 13 supplied to both setters 9 and 10 the coefficicient of friction $\mu$ corresponding to the ratio $\alpha$ to be supplied.

The solenoid valve 15 to which the moderation signal m and moderation release signal $\overline{m}$ are given from the signal generator 14 operates, on receiving the moderation signal m, to let the hydraulic pressure P from the master cylinder 2 pass into a rank of hydraulic pressure source 18, and on receiving the moderation release signal $\overline{m}$, it operates to supply the hydraulic pressure from the source 18 to the wheel cylinder 3 to recover the once moderated hydraulic pressure P.

The antiskid control device 30 constructed as described above will now be described from its operational aspect.

In the setter 9 are preset the initial values $\dot{V}_{r0}$ and $S_{r0}$ of the deceleration $\dot{V}_r$ of simulated vehicle speed $V_r$ and the slip rate $S_r$, respectively. As the initial values $V_{r0}$ and $S_{r0}$, for the sake of safety, the values for a road surface having a high coefficient of friction, for example, $V_{r0} = -1G$ (G standing for gravitational acceleration) and $S_{r0} = 0.25$, are set. In a vehicle 6 running at a speed of $V_{w0}$, when a depressing force is applied to the pedal 1 at the time $t_0$ to supply the hydraulic pressure P from the master cylinder 2 to the wheel cylinder 3, the setter 9 performs clock operation by the signal from a switch (not shown) which detects the application of the depressing force on the pedal 1, and it receives from the detector 8 the wheel circumferential speeds $V_{w0}$, $V_{w01}$, $V_{w02}$, $V_{w03}$, ..., at every predetermined time $t_0$, $t_{01}$, $t_{02}$, $t_{03}$, ..., and carries out successively the calculation of simulated vehicle speed $V_{r0}$ based on:

$$V_{r01} = V_{w0} - \dot{V}_{r0}(t_{01} - t_0) = V_{w0} - \dot{V}_{r0}T_s$$

at the time $t_{01}$, $$V_{r02} = V_{w01} - \dot{V}_{r0}(t_{02} - t_{01}) = V_{w01} - \dot{V}_{r0}T_s$$

at the time $t_{02}$, and $$V_{r03} = V_{w02} - \dot{V}_{r0}(t_{03} - t_{02}) = V_{w02} - \dot{V}_{r0}T_s$$

at the time $t_{03}$. Further, at the times $t_{01}$, $t_{02}$, $t_{03}$, ..., the simulated vehicle speeds $V_{r01}$, $V_{r02}$, $V_{r03}$, ... calculated at said respective times are compared with the actual wheel circumferential speeds $V_{w01}$, $V_{w02}$, $V_{w03}$, ... at the corresponding times, and when the simulated vehicle speed becomes greater than the actual wheel circumferential speed, it is assumed that the wheel 4 has begun slipping and said calculation and comparison are stopped. At the same time, with the calculation formula of the simulated vehicle speed in said case of greater simulated vehicle speed than the actual wheel circumferential speed being given as the calculation formula of simulated vehicle speed $V_{r1}$ at the first cycle in the antiskid control cycles for rise and drop of wheel circumferential speed, the calculation of the target wheel circumferential speed $V_{s1}$ at said first cycle is started with said simulated vehicle speed $V_{r1}$. Thus, for instance, when the simulated vehicle speed has become greater than the wheel circumferential speed for the first time at the time $t_{03}$ ($=t_1$), the setter 9 makes the following calculation:

$$V_{s1} = [V_{w02} - \dot{V}_{r0}(t-t_{02})](1-S_{r0})$$

wherein t is the time which has elasped from the time $t_0$, and $[V_{w02} - \dot{V}_{r0}(t-t_{02})]$ is the simulated vehicle speed $V_{r1}$ of the first cycle. The setter 9 outputs the result of calculation as the first target wheel circumferential speed $V_{s1}$ to the setter 10 and comparator 11. The setter 10 calculates the target wheel circumferential speeds $V_{k11}$ and $V_{k21}$ corresponding to the slip rates 0.1 and 0.3, respectively, from the supplied target wheel circumferential speed $V_{s1}$ and compares the thus calculated target wheel circumferential speeds $V_{k11}$ and $V_{k21}$ with the wheel circumferential speed $V_w$. When $V_{k11}$ becomes greater than $V_w$ at the time $t_2$, the setter 10 delivers a signal $T_k$ while the calculator 12, on receiving the signal $T_k$ at the time $t_2$, stores the time $t_2$ from the timer 16 and the wheel circumferential speed $V_w$ from the detector 8 as $t_{p1}$ and $V_{wp1}$, respectively. The comparator 11 compares the supplied target wheel circumferential speed $V_{s1}$ with the present wheel circumferential speed $V_w$ and outputs the result of comparison to the signal generator 14. When $V_w$ becomes smaller than $V_{s1}$ at the time $t_3$, the signal generator 14 detects it and issues a moderation signal m to the solenoid valve 15 which, on receiving this signal, is operated to let the hydraulic pressure P from the master cylinder 2 pass into the tank of hydraulic pressure source 18 to cause a reduction of hydraulic pressure P supplied to the wheel cylinder 3 from the master cylinder 2. Even if the hydraulic pressure P supplied to the wheel cylinder 3 is reduced, the wheel circumferential speed $V_w$ does not rise up immediately due to the moment of inertia of the wheel 4 and other factors; it rises up after once reduced after the time $t_3$. When $V_{k21}$ becomes greater than $V_w$ at the time $t_4$ and becomes smaller than $V_w$ at the time $t_5$, the setter 10 issues a signal $T_k$ at said respective times and the calculator 12, on receiving this signal $T_k$ at the times $t_4$ and $t_5$, stores the times $t_4$ and $t_5$ from the timer 16 and the wheel circumferential speed $V_w$ from the detector 8 as $t_{q1}$, $t_{r1}$ and $V_{wq1}$, $V_{wr1}$, respectively. When $V_w$ becomes greater than $V_{s1}$ at the time $t_6$, the signal generator 14 detects it and issues a moderation release signal $\overline{m}$ to the solenoid valve 15 which now allows the hydraulic pressure from the hydraulic pressure source 18 to be supplied to the wheel cylinder 3 to recover the previously reduced hydraulic pressure P. Recovery of hydraulic pressure P does not cause immediate drop of the wheel circumferential speed $V_w$, so that when $V_{k11}$ becomes smaller than $V_w$ at the time $t_7$, the setter 10 issues a signal $T_k$ and the calculator 12 stores the time $t_7$ and wheel circumferential speed $V_w$ as $t_{s1}$ and $V_{ws1}$, respectively, and at the same time it calculates the ratio $\alpha_1$ in accordance with the following equation:

$$\text{ratio } \alpha_1 = \left| \frac{\frac{V_{ws1} - V_{wr1}}{t_{s1} - t_{r1}}}{\frac{V_{wq1} - V_{wp1}}{t_{q1} - t_{p1}}} \right|$$

and supplies the result of this calculation to the transducer 13. From the supplied ratio $\alpha_1$, the transducer 13 determines the coefficient of friction $\mu_1$ corresponding to the ratio $\alpha_1$ and supplies the determined coefficient of friction $\mu_1$ to the setters 9 and 10. The setter 9 corrects the simulated wheel circumferential deceleration $\dot{V}_r$ from $\dot{V}_{r0}$ to $-\mu_1 G$ (G being the gravitational acceleration) according to the supplied coefficient of friction $\mu_1$ and determines the simulated vehicle speed from the corrected $\dot{V}_{r2} = -\mu_1 G$ in the same way as said calculation from time $t_0$ to $t_1$. Comparison of this calculated simulated vehicle speed with the wheel circumferential speed is made successively, and when the simulated vehicle speed becomes greater than the wheel circumferential speed at the time $t_9$, it is taken that the wheel 4 has again begun slipping and the calculation of the target wheel circumferential speed $V_{s2}$ at the second cycle of the antiskid control cycles for rise and drop of wheel circumferential speed is started according to the simulated vehicle speed $V_{r2}$ determined in the same way as described above. The result of this calculation is delivered as the new target wheel circumferential speed $V_{s2}$ to the setter 10 and comparator 11. Then, in the same way as described above, the setter 10 calculates the target wheel circumferential speeds $V_{k12}$ and $V_{k22}$ corresponding to the slip rates 0.1 and 0.3, respectively, and based on this, the calculator 12 performs the calculation of the ratio $\alpha_2$ and issues the new coefficient of friction $\mu_2$. Also, when $V_w$ becomes smaller than $V_{s2}$ at the time $t_{10}$, the generator 14 issues a moderation signal m to carry out a brake moderation operation, and when $V_w$ becomes greater than $V_{s2}$ at the time $t_{11}$, the generator 14 now issues a moderation release signal $\overline{m}$ to release the moderation operation. Thereafter, the same operations as described above are repeated. In case $V_w$ becomes smaller than $V_{s2}$ during the period from time $t_7$ to $t_8$ due to the new target wheel circumferential speed $V_{s2}$, a moderation signal m is issued during this period. Also, in case the wheel circumferential speed $V_w$ didn't become equal to the calculated target wheel circumferential speeds $V_{k21}$, $V_{k22}$, ..., this is regarded as a weak lock of wheel and there is conducted no estimation of $\mu$ nor any correction of the simulated wheel circumferential deceleration $\dot{V}_r$.

According to the control device 30 constructed as described above, the coefficient of friction $\mu$ is estimated by determining the ratio $\alpha$ and, based on this, the simulated vehicle speed $V_r$ and the target wheel circumferential speed $V_s$ are corrected, so that the device is capable of making antiskid control corresponding substantially to the change of coefficient of friction $\mu$.

Figure 4:
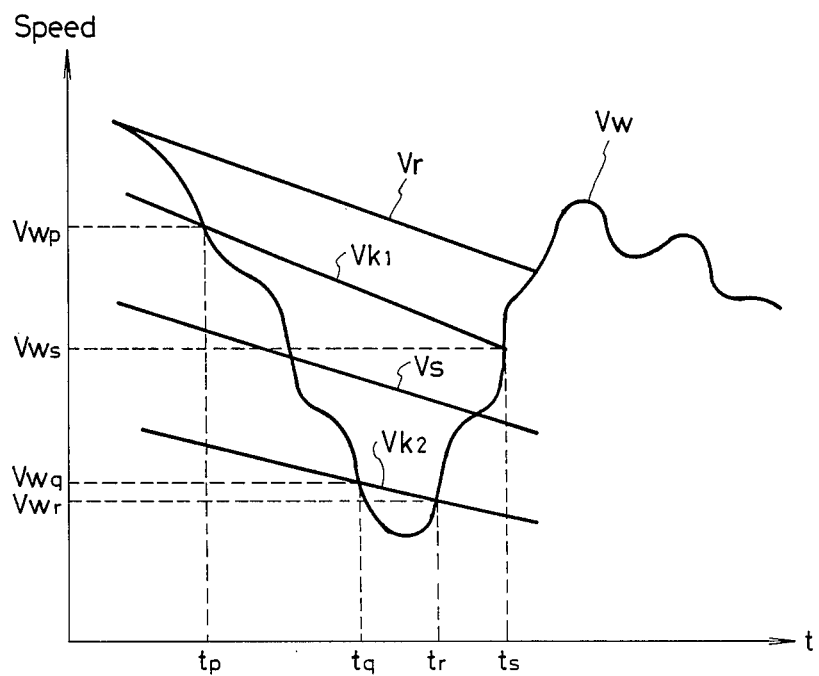
FIG. 4 is a graph illustrating the acting performance of the embodiment shown in FIG. 2.

Further, since the ratio $\alpha$ is determined from the average acceleration $\overline{V}_{wu}$ and average deceleration $\overline{V}_{wd}$, the device is substantially independent of the non-smooth change of the wheel circumferential speed $V_w$ that tends to take place on a rough road, that is, the momentary change of acceleration or deceleration of wheel circumferential speed, as shown in FIG. 4, and is therefore capable of specifying substantially the desired coefficient of friction $\mu$ to allow normal antiskid operations.

Figure 7:
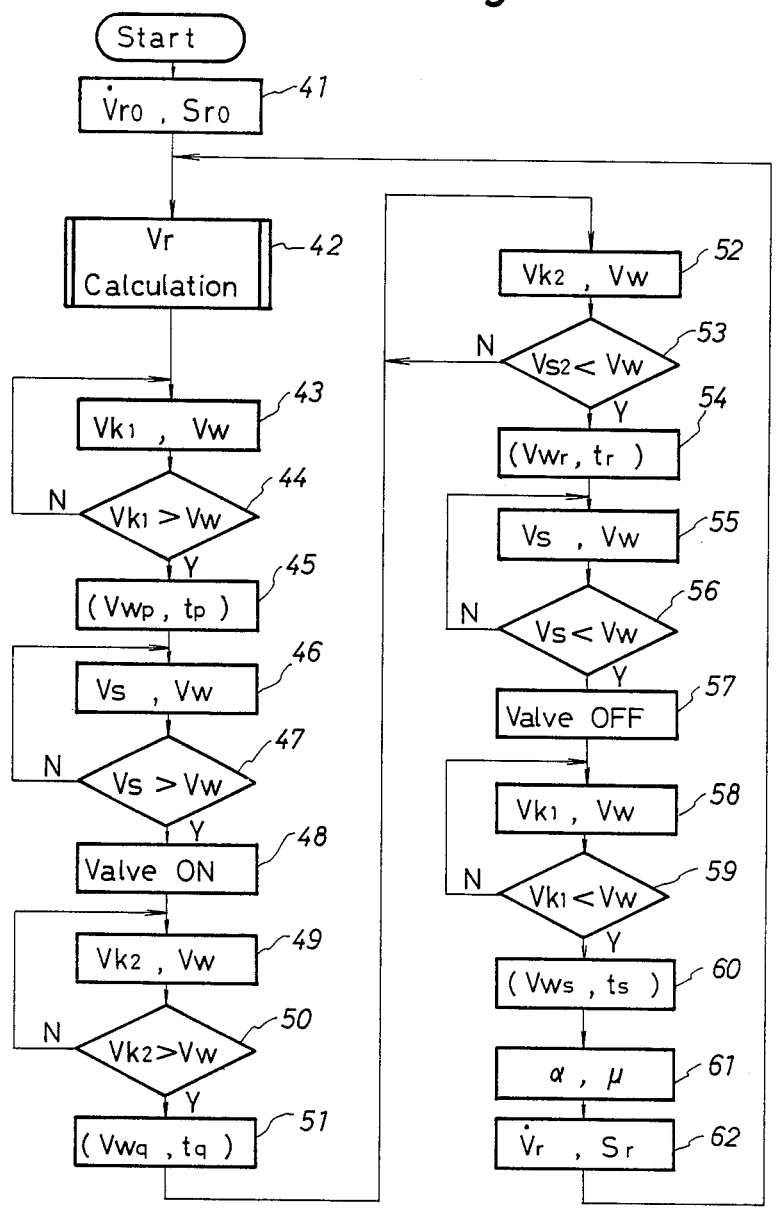
FIGS. 7 and 8 are the flow charts of programs in the case of using microcomputers in place of the embodiment shown in FIG. 2.
Figure 8:
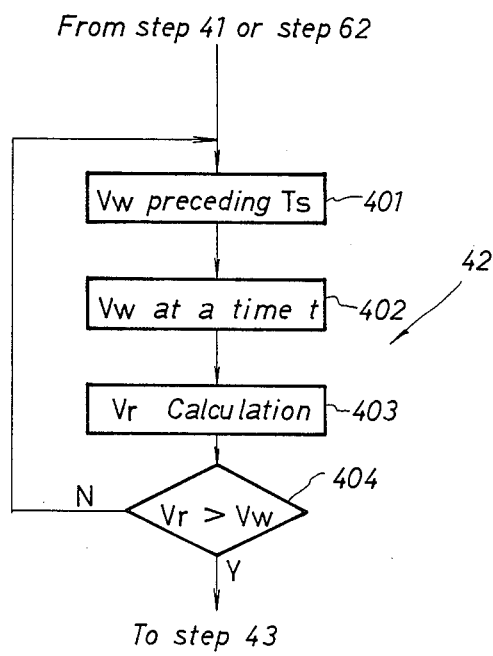

In the embodiment described above, there are provided the setters 9, 10, comparator 11, calculator 12, transducer 13, generator 14 and timer 16 to constitute an electronic control circuit 31, but it is possible to constitute the electronic control circuit 31 by using microcomputers and to operate these microcomputers according to a program comprising the steps shown in FIGS. 7 and 8 to thereby effectuate the same operations as in the above-described embodiment. This program is started by a signal from a switch which is turned on when the pedal 1 is depressed. At the step 41, the initial values $\dot{V}_{r0}$ and $S_{r0}$ of the simulated vehicle deceleration $\dot{V}_r$ and the slip rate S, respectively, are set, and at the step 42, a subroutine such as shown in FIG. 8 is practiced. At the step 401 of said subroutine, the wheel circumferential speed $V_w$ from the detector 8 at a time t preceding a predetermined period of time $T_s$ from the said time t is set, and at the step 402 the wheel circumferential speed $V_w$ from the detector 8 at the said time t is set. At the step 403, $V_w$ set at the step 401 is substituted in the formula $V_r = V_w - \dot{V}_{r0} - T_s$ to calculate the simulated vehicle speed $V_r$ at the said time t at the step 401. At the step 404, the simulated vehicle speed $V_r$ calculated at the step 403 is compared with the wheel circumferential speed $V_w$ set at the step 402, and when $V_r < V_w$, the program returns to the step 401 to repeat the same operation as said above at a time t after the lapse of next predetermined period of time $T_s$, and when $V_r > V_w$, the program passes the subroutine and proceeds to the step 43. At the step 43, the wheel circumferential speed $V_w$ and the target wheel circumferential speed $V_{k1}$ (for instance, $V_{k1}$ when the slip rate S is 0.1) are calculated (the latter being calculated from the simulated vehicle speed $V_r$ obtained from the subroutine 42). As the step 44, it is judged whether the wheel circumferential speed $V_w$ is lower than $V_{k1}$, and if $V_w > V_{k1}$, the program returns to the step 43. If it is judged that $V_w < V_{k1}$ at the time $t_p$, the program proceeds to the step 45 at which the wheel circumferential speed $V_{wp}$ at the time $t_p$ and the time $t_p$ are stored. At the step 46, the target wheel circumferential speed $V_s$ with the initially set slip rate $S_{r0}$ and the wheel circumferential speed $V_w$ are calculated. The results of the calculations are compared at the step 47, and when $V_w > V_s$, the program returns to the step 46, while when it is judged that $V_w < V_s$, the program proceeds to the step 48. At the step 48, the solenoid valve 15 is set to effect a hydraulic pressure moderating operation. At the step 49, the target wheel circumferential speed $V_{k2}$ (for instance, when the slip rate S = 0.3) and the wheel circumferential speed $V_w$ are calculated. At the step 50, the target wheel circumferential speed $V_{k2}$ calculated at the step 49 is compared with the wheel circumferential speed $V_w$, and when $V_w > V_{k2}$, the program returns to the step 49, while when it is judged that $V_w < V_{k2}$ at the time $t_q$, the program proceeds to the step 51. At the step 51, the time $t_q$ and the wheel circumferential speed $V_{wq}$ at the time $t_q$ are stored. Thereafter, the target wheel circumferential speed $V_{k2}$ and the wheel circumferential speed $V_w$ are again calculated at the step 52. This calculated target wheel circumferential speed $V_{k2}$ is compared with the wheel circumferential speed $V_w$ at the step 53, and when $V_w < V_{k2}$, the program returns to the step 52, and when it is judged that $V_w > V_{k2}$ at the time $t_r$, the program proceeds to the step 54 at which the time $t_r$ and the wheel circumferential speed $V_{wr}$ at the time $t_r$ are stored. At the next step 55, the target wheel circumferential speed $V_s$ corresponding to the initially set slip rate $S_{r0}$ and the wheel circumferential speed $V_w$, are again calculated, and at the step 56 the target wheel circumferential speed $V_s$ calculated at the step 55 is compared with the wheel circumferential speed $V_w$. If $V_w < V_s$, the program returns to the step 55, and when it is judged that $V_w > V_s$, the program proceeds to the step 57. At the step 57, the solenoid valve 15 is set to release the hydraulic pressure moderation operation mode, and at the step 58 the target wheel circumferential speed $V_{k1}$ and the wheel circumferential speed $V_w$ are again calculated. At the step 59, this calculated target wheel circumferential speed $V_{k1}$ is compared with the wheel circumferential speed $V_w$, and when $V_w < V_{k1}$, the program returns to the step 58, and when it is judged that $V_w > V_{k1}$ at the time $t_s$, the program proceeds to the step 60 at which the time $t_s$ and the wheel circumferential speed $V_{ws}$ at the time $t_s$ are stored. At the step 61, the ratio $\alpha$ is calculated and the coefficient of friction $\mu$ corresponding to the calculated ratio $\alpha$ is determined. The coefficient of friction $\mu$ corresponding to the ratio $\alpha$ is previously stored as a conversion table in a memory. At the step 62, the simulated vehicle acceleration/deceleration $\dot{V}_r$ is corrected to $-\mu G$ based on the coefficient of friction $\mu$ determined at the step 61. Thereafter, the program returns to the step 42 and the above-described steps are repeated.

In the embodiment described above, the slip rate S is fixed, but the present invention can be otherwise embodied. For eliminating a rocking phenomenon that tends to occur on a road surface with a low coefficient of friction or a brake-retarding phenomenon which tends to occur on a road surface with a high coefficient of friction, the device of this invention may be designed so that the slip rate $S_r$ will be corrected along with the correction of the simulated vehicle acceleration or deceleration $\dot{V}_r$. In this case, as examples of the corrected setting values of the simulated vehicle acceleration/deceleration $\dot{V}_r$ corresponding to the coefficient of friction $\mu$ and the slip rate $S_r$, there have experimentally been obtained the following values of slip rate $S_r$: $S_r = 0.3-0.4$ in the case of a high coefficient of friction, viz. when the coefficient of friction is 0.6 or above, $S_r = 0.2-0.3$ in the case of a medium coefficient of friction, viz. when the coefficient of friction is below 0.6 but not smaller than 0.35, and $S_r = 0.1-0.2$ in the case of a low coefficient of friction, viz. when the coefficient of friction is below 0.35.

Also, the device may be so designed that in the case of calculating the target wheel circumferential speed $V_{k1}$ and $V_{k2}$ by the setter 10, the slip rate S is changed corresponding to the coefficient of friction $\mu$.

Further, the present invention, which has hereinabove been described regarding its adaptation to a single wheel brake system, embraces other forms of adaptation. The device can be designed such that said braking action will be applied severally to the four wheels of an automobile, or it will be applied severally to the right and left front wheels while similarly to the right and left rear wheels, or it will be applied to a dual brake system in which the front and rear wheel brake pipes are arranged in an X form.

As described above, according to this invention since the electronic control circuit is so constructed that the ratio of the mean value of rising rates and the mean value of lowering rates of the circumferential speed of wheel in a predetermined period of time in every antiskid control cycle for rise and drop of the circumferential speed of wheel is determined, that the coefficient of friction of road surface is estimated from the thus determined ratio, and that the solenoid valve for controlling the hydraulic braking pressure to the wheel is controlled based on the estimated coefficient of friction of road surface, the extremely excellent antiskid control can be performed even if the coefficient of friction $\mu$ widely varies, the braking distance can be reduced, the braking can be applied while sufficiently retaining steering stability, and further, the coefficient of friction can be estimated as desired even if the circumferential speed of wheel changes non-smoothly on a rough road, and accordingly, excellent antiskid can be attained even when the vehicle is running on a rough road or ground.

What is claimed is:

1. An antiskid control device comprising:
   a detector for detecting signals corresponding to a circumferential speed of a wheel;
   valve means for controlling a hydraulic braking force to the wheel; and
   electronic control circuit means for determining a ratio of a mean angular acceleration of the wheel to a mean angular deceleration of the wheel in a predetermined period of time based on detection signals from said detector during an antiskid control cycle for raising and lowering the circumferential speed of the wheel, for estimating a coefficient of friction of road surface from said ratio, for determining a target circumferential speed of the wheel based on said estimated coefficient of friction of road surface, and for activating said valve means to cause the wheel circumferential speed to approach said target circumferential speed.

2. The antiskid control device according to claim 1, wherein said electronic control circuit means determines the target circumferential speed of the wheel by calculating a simulated vehicle deceleration based on said estimated coefficient of friction of road surface.

3. The antiskid control device according to claim 1, wherein said electronic control circuit means determines the target circumferential speed of the wheel by calculating a simulated vehicle deceleration based on a slip rate determined from said estimated coefficient of friction of road surface

* * * * *